Dec. 26, 1950 W. BENNETT, JR 2,535,717
WING CUTTER
Filed May 18, 1949
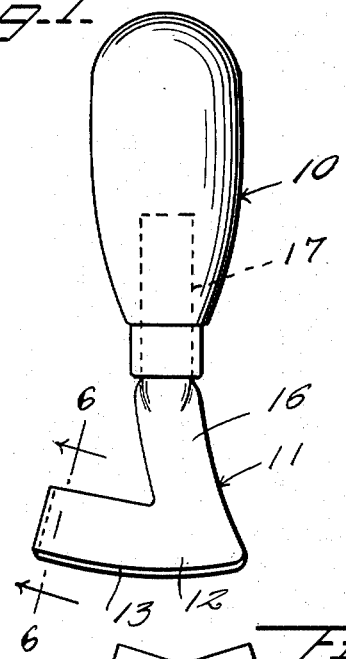
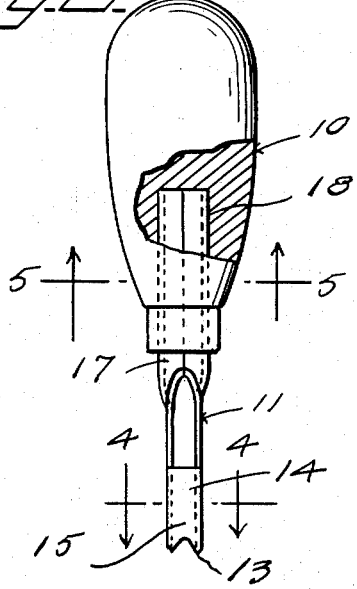
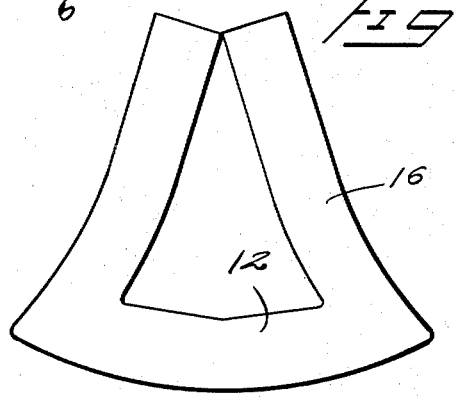
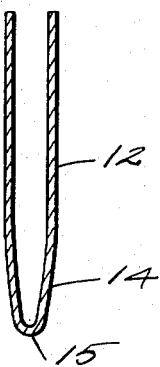
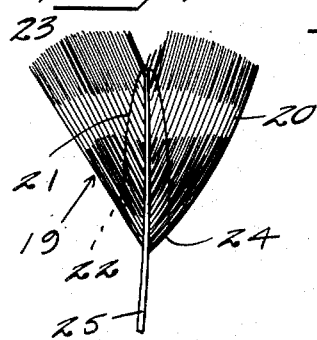
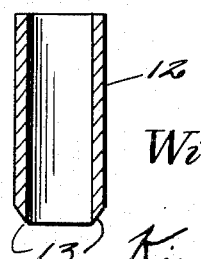
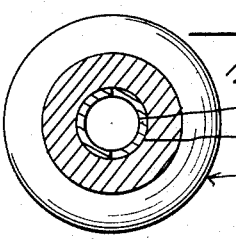
INVENTOR.
William Bennett, Jr.
BY
Kimmel & Crowell ATTORNEYS Patented Dec. 26, 1950

2,535,717

UNITED STATES PATENT OFFICE 2,535,717

WING CUTTER

William Bennett, Jr., Mechanicsburg, Pa.

Application May 18, 1949, Serial No. 94,000

4 Claims. (Cl. 30—299)

This invention relates to a cutter for cutting feathers for use on fish lures.

In the making of fish lures such as flies, feathers are used having a special coloring and such feathers are cut to simulate the wings of insects. Heretofore it has been difficult to obtain matching feathers and the proper cutting or trimming of the feathers has been done by an expert. It is, therefore, an object of this invention to provide a cutter which will permit the use of feathers from various spots or areas on the same bird or fowl, and such feathers can be quickly cut at selected points to produce the desired wings for the flies.

Another object of this invention is to provide a cutter embodying a U-shaped blade having a convex cutting edge which is adapted to be rocked for cutting the feather at the selected point, the barbs of the quill being cut in substantially the shape of a parabola. The length of the wing may be subsequently trimmed by breaking the barbs from the quill, or cutting the barbs with a sharp blade, leaving a sufficient length of quill for securing the same to the lure.

With the above and other objects in view, my invention consists in the arrangement, combination and details of construction disclosed in the drawing and specication, and then more particularly pointed out in the appended claims.

In the drawing:

Figure 1 is a detail side elevation of a wing cutter constructed according to an embodiment of this invention, Figure 2 is a detail end elevation, partly broken away and in section, of the device, Figure 3 is a plan view of a blank cutter blade, Figure 4 is a sectional view taken on the line 4—4 of Figure 2, Figure 5 is a sectional view taken on the line 5—5 of Figure 2, Figure 6 is a sectional view taken on the line 6—6 of Figure 1, Figure 7 is a plan view of a feather showing in heavy solid lines the manner in which this cutter operates.

Referring to the drawing, the numeral 10 designates generally a handle which has secured thereto a wing cutter generally designated as 11. The cutter 11 comprises a pair of blades 12 which are disposed in parallel relation for a substantial length and are formed at their lower edges with convex keen cutting edges 13. The radii of the cutting edges are not less than two and one-half inches and not more than five inches.

The blades 12 converge toward each other, as indicated at 14, and are connected together at their forward edges by a curved connecting portion 15. The blades 12 have extending upwardly therefrom and formed integral therewith, a pair of shanks 16 which at their upper ends are bent into tubular form, as indicated at 17, for engagement in an opening 18 formed in the handle 10.

In the use and operation of this device, a feather generally designated as 19 is laid flat on a board or other plane surface, and the cutter hereinbefore described is then placed over the feather 19 with the end 15 of the blades 12 outermost. The cutter is then pressed downwardly onto the feather 19, cutting the barbs 20 of the feather along the line 21 and the dotted line 22. The desired length of the wing 23 may be obtained by pulling or breaking off the short barbs 24 from the quill 25. As herein disclosed, the wing 23 will finally assume the configuration shown in heavy full lines in Figure 7.

With a cutter as hereinbefore described, feathers may be taken from any selected portions of a bird or fowl and it will be a relatively simple matter to duplicate the markings on the feathers which are used to form the wings. These wings are finally used in the formation of fish lures embodying insects, such as flies or the like.

I do not mean to confine myself to the exact details of construction herein disclosed, but claim all variations falling within the purview of the appended claims, including deviation in the shape of the cutter to provide for differently shaped wings.

What I claim is:

1. A feather cutter for forming the wings of fish lures of the insect or fly type, comprising a substantially U-shaped blade having a convex lower cutting edge, a pair of shank members extending from the upper edges of the parallel sides of said blade, and a handle fixed to said shanks.

2. A feather cutter for forming the wings of fish lures of the insect or fly type, comprising a substantially U-shaped blade, the sides of said blade being parallel for a substantial distance and converging toward each other adjacent the bight of the blade, shank means extending from said blade, and a handle on said shank means.

3. A feather cutter for forming the wings of fish lures of the insect or fly type, comprising a substantially U-shaped blade, the sides of said blade being parallel for a substantial distance and converging toward each other adjacent the bight of the blade, a pair of shanks extending from the parallel sides of said blade, and a handle on said shanks.

4. A feather cutter for forming the wings of fish lures of the insect or fly type, comprising a substantially U-shaped blade having a convex lower cutting edge, the sides of said blade being parallel for a substantial distance and converging toward each other adjacent the bight of said blade, a shank extending from at least one parallel side of the blade, and a handle extending from said shank.

WILLIAM BENNETT, Jr.

REFERENCES CITED

The following references are of record in the file of this patent:

UNITED STATES PATENTS

| Number | Name | Date |
| --- | --- | --- |
| D. 88,766 | Garrett | Dec. 27, 1932 |
| 841,099 | Anderson | Jan. 15, 1907 |